(12) United States Patent
Yoshida

(10) Patent No.: US 6,198,255 B1
(45) Date of Patent: Mar. 6, 2001

(54) CHARGE/DISCHARGE CONTROLLING SEMICONDUCTOR DEVICE

(75) Inventor: Shinichi Yoshida, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/549,359

(22) Filed: Apr. 14, 2000

(30) Foreign Application Priority Data

Apr. 15, 1999 (JP) .................................................. 11-108002

(51) Int. Cl.[7] .................................................. H01M 10/46
(52) U.S. Cl. .............................................. 320/134; 320/136
(58) Field of Search .................................... 320/127, 128, 320/132, 134, 135, 136, 137

(56) References Cited

U.S. PATENT DOCUMENTS

| 5,783,322 | * | 7/1998 | Nagai et al. . |
| 5,909,103 | * | 6/1999 | Williams . |
| 5,909,104 | * | 6/1999 | Scott . |

* cited by examiner

*Primary Examiner*—Edward H. Tso
(74) *Attorney, Agent, or Firm*—Adams & Wilks

(57) ABSTRACT

In a charge/discharge controlling semiconductor device for a secondary batter which can be used repeatedly even after detection of an abnormal charging current, the abnormal charging current is detected by using the resistance value of the on-state of a switching element without a current fuse for detection of the abnormal charging current.

4 Claims, 5 Drawing Sheets

CHARGE/DISCHARGE CONTROLLING SEMICONDUCTOR DEVICE

BACKGROUND OF THE INVENTION

1. Field of the Invention

The present invention relates to the protection of a secondary battery in the case where a charging current from a charger to a secondary battery is abnormally large (in case of an abnormal charging current).

2. Description of the Related Art

FIG. 2 shows a conventional protective IC and protective device against charge and discharge of a secondary battery. The conventional protective device includes a convention IC 21, a discharging current control switching element 16, a charging current control switching element 17 and a current fuse 22. The conventional protective IC 21 includes an overcharge detecting circuit 7, an overdischarge detecting circuit 8, an overcurrent detecting circuit 9, a level converting circuit 10, a NOR circuit 14 and so on. The protective IC 21 has a function of preventing a secondary battery 15 from being charged up to an excessive voltage by controlling the on/off operation of the discharging current control switching element 16 and the charging current control switching element 17 (an overcharge protective function), a function of preventing the secondary batter 15 from being discharged down to a too small voltage (an overdischarge protection function), and a function of preventing the secondary battery 15 from discharging an excessive current (an overcurrent protection function).

In order to realize a function of preventing an excessive charging current from flowing into the secondary battery 15 from the charger (an abnormal charging current protection function), the conventional protective device is designed such that a current fuse 22 is disposed between a secondary battery positive electrode connection terminal 2 and a charger positive electrode connection terminal 19 and the current fuse 22 is cut when a large charging current (abnormal charging current) flows.

In the case of using the conventional current fuse 22, there arises such a problem that the secondary battery including the protective device is never again used if the abnormal charging current is detected once. Also, there arises such a problem that the efficiency is deteriorated by heat of the resistance component of the current fuse. Further, there arises such a problem that the addition of the current fuse causes the number of parts to increase and the mounted area increases, resulting in the prevention of lowering the costs, decreasing the size and weight thereof.

SUMMARY OF THE INVENTION

The present invention has been made in order to solve the above problem, and therefore has an object to provide a charge/discharge controlling semiconductor device which detects an abnormal charging current using the resistance value of the on-state of a switching element without using a current fuse.

In order to achieve the above object, according to the present invention, there is provided a device for controlling a charging current flowing from a charger to a secondary battery and a discharging current flowing from the secondary battery to a load by the on/off operation of a switching element, in which an abnormal charging current is detected by using the resistance value of the on-state of the switching element, and the abnormal charging current detection state is held until the charger is separated after the detection of the abnormal charging current.

BRIEF DESCRIPTION OF THE DRAWINGS

These and objects, features and advantages of this invention will become more fully apparent from the following detailed description taken with the accompanying drawings in which.

DETAILED DESCRIPTION OF THE PREFERRED EMBODIMENTS

Now, a description will be given in more detail of an embodiment of the present invention with reference to the accompanying drawings.

Figure 1:
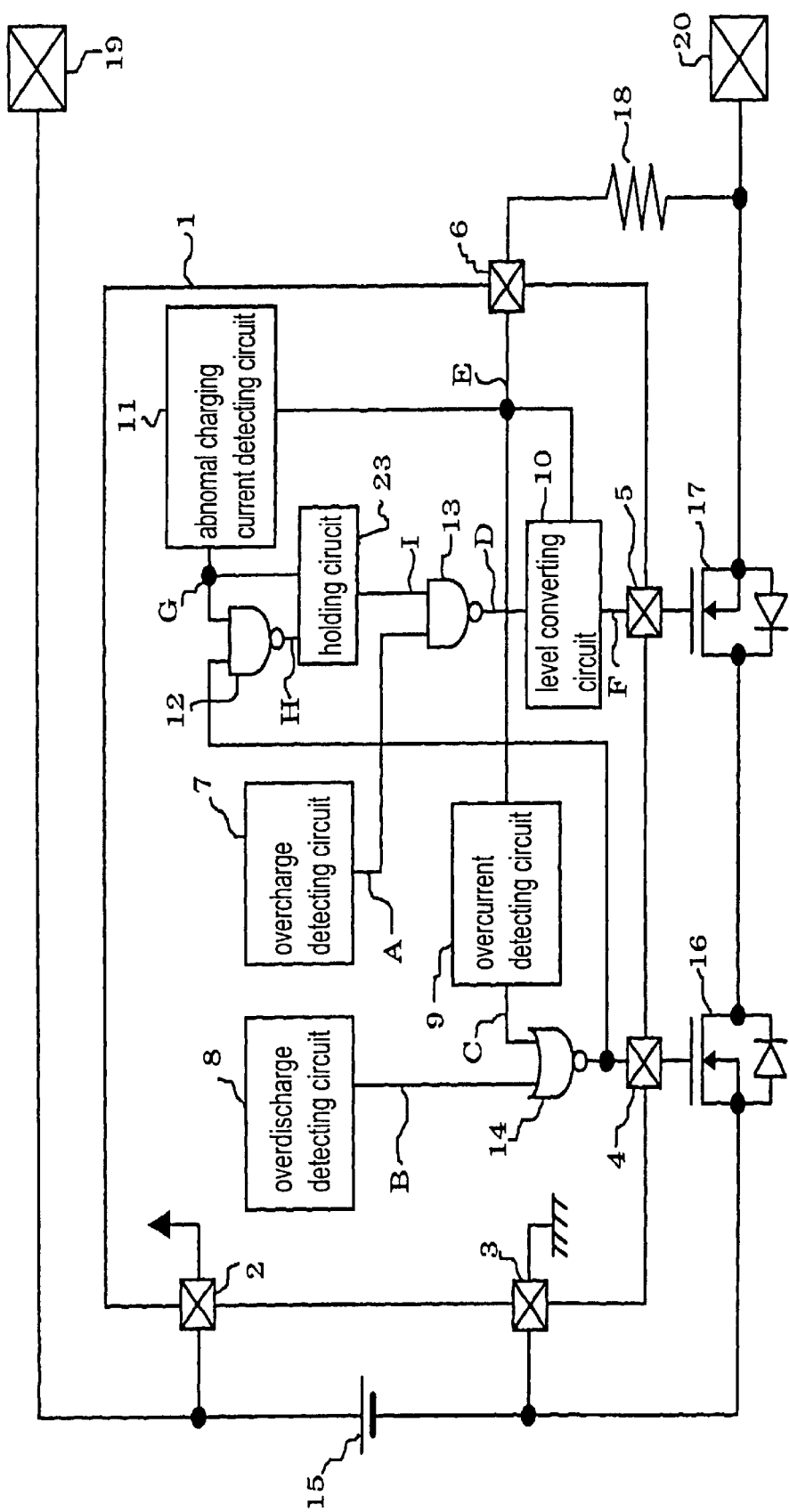
FIG. 1 is a circuit diagram showing a protective IC and a protective device in accordance with the present invention.
Figure 2:
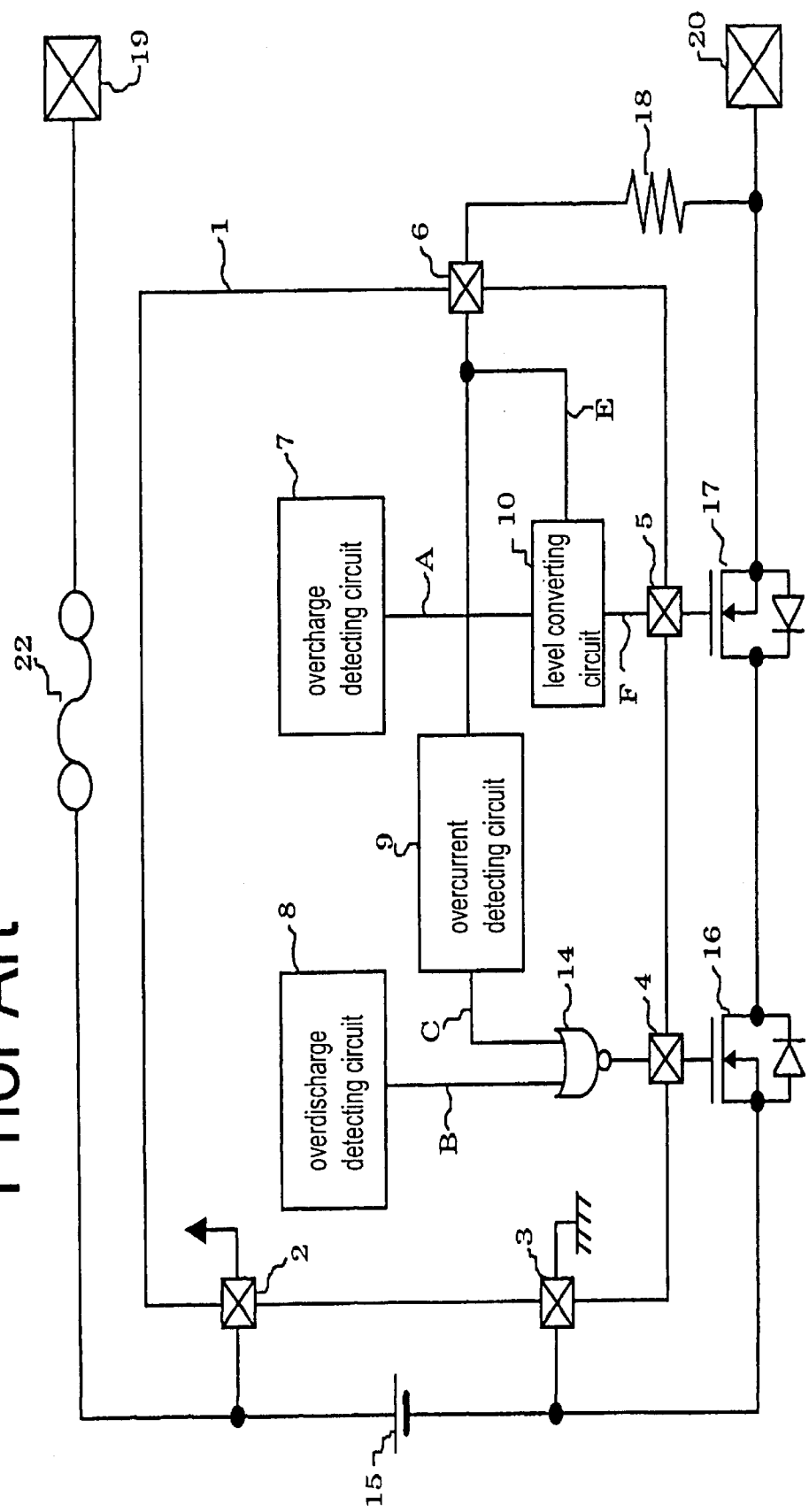
FIG. 2 is a circuit diagram showing a conventional protective IC and protective device.

FIG. 1 shows a protective IC and a protective device in accordance with an embodiment of the present invention. The protective device of the present invention includes the protective IC1, a discharging current control switching element 16 and a charging current control switching element 17. The protective IC 1 includes an overcharge detecting circuit 7, an overdischarge detecting circuit 8, an overcurrent detecting circuit 9, a level converting circuit 10, an abnormal charging current detection circuit 11, a NOR circuit 14, NAND circuits 12, 13, a holding circuit 23 and so on. The protective IC 1 has a function of preventing a secondary battery 15 from being charged up to an excessive voltage by controlling the on/off operation of the discharging current control switching element 16 and the charging current control switching element 17 (an overcharge protection function), a function of preventing the secondary battery 15 from being discharged down to a too small voltage (an overdischarge protection function), a function of preventing the secondary battery 15 from allowing an excessive discharging current to flow (an overcurrent protection function), and a function of preventing an excessive charging current from flowing into the secondary battery 15 from a charger (an abnormal charging current protection function).

The overcharge detecting circuit 7 is so designed as to turn off the charging current control switching element 17 through the level converting circuit 10 when a voltage between a secondary battery positive electrode connection terminal 2 and a secondary battery negative electrode connection terminal 3 becomes a desired voltage (for example, 4.2V) or more.

The level converting circuit 10 is so designed as to convert the low level of a charging current control switching element connection terminal 5 into the potential of a charger negative electrode connection terminal 20.

The overdischarge detecting circuit 8 is so designed as to turn off the discharging current control switching element 16 when a voltage between the secondary battery positive electrode connection terminal 2 and the secondary battery negative electrode connection terminal 3 becomes a desired voltage (for example, 2.3V) or less.

The overcurrent detecting circuit 9 is so designed as to turn off the discharging current control switching element 16 when a voltage of the charger negative electrode connection terminal 20 becomes a desired voltage value (for example, +0.2V) or more with respect to the voltage of the secondary battery negative electrode connection terminal 3.

A resistor 18 is so designed as to limit a current flowing when the positive pole and the negative pole of the charger are conversely connected, normally has a value on the order of between 1 KÚ and 1MÚ.

The abnormal charging current detecting circuit 11 is so designed as to turn off the charging current control switching element 17 when a voltage of the charger negative electrode connection terminal 20 becomes a desired voltage value (for example, −0.4V) or less with respect to the voltage of the secondary battery negative electrode connection terminal 3.

In this example, when the discharging current control switching element 16 is included in a detected voltage section (between the charger negative electrode connection terminal 20 and the secondary battery negative electrode connection terminal 3 in FIG. 1) of the abnormal charging current detecting circuit 11 as shown in FIG. 1, in order to detect the abnormal charging current with a desired charging current (for example, a charging current of 2 A or more), the abnormal charging current detection voltage must be changed depending on the charging current control switching element 16 being on or off. This is because when the discharging current control switching element 16 is included in the detected voltage section (between the charger negative electrode connection terminal 20 and the secondary battery negative electrode connection terminal 3 in FIG. 1) of the abnormal charging current detecting circuit 11 as shown in FIG. 1, the resistance value of the switching element is different by 10 figures of more for a case in which the discharging current control switching element 16 is on and a case in which the element 1 is off even if the name charging current flows, as the result of which a voltage developed in the detected voltage section of the abnormal charging current detecting circuit 11 is largely different.

In view of the above, according to the present invention, since the abnormal charging current is detected only when the charging current control switching element 16 is on, the abnormal charging current detection voltage can be fixed.

In the embodiment shown in FIG. 1, the charging current control switching element 17 is turned off by the NAND circuit 17 when the discharging current control switching element 16 is on and the voltage of the charger negative electrode connection terminal 20 is a desired voltage value (for example, 0.4V) or less with respect to the voltage of the secondary battery negative electrode connection terminal 3.

Also, in the embodiment of FIG. 1, the abnormal charging current detection state is held regardless of the on/off state of the discharging current control switching element until the charger is separated (until the abnormal charging current is released) after the abnormal charging current is detected by the holding circuit 23, so that the abnormal charging current protection function is always effective while the abnormal charger is connected.

In the case where there is no circuit for holding the abnormal charging current detection state (holding circuit 23), if the abnormal charger is connected to the secondary battery having an overdischarge detection voltage or less, oscillation is made while repeating the following operation (1) to (9).

(1) An excessive charging current flows when the abnormal charger is connected to the secondary battery having the overdischarge detection voltage or less.

(2) The voltage across the secondary battery elevates to an overdischarge release voltage or more by the abnormal charging current and the internal impedance of the secondary battery.

(3) The protective IC turns on the discharging current control switching element by releasing overdischarge.

(4) The detection of the abnormal charging current starts since the discharging current control switching element turns on.

(5) The discharging current control switching element is turned off upon detection of the abnormal charging current.

(6) Since the charging current control switching element turns off, the charging current is interrupted, and the voltage across the secondary battery drops to the overdischarge detection voltage or less again.

(7) The protective IC turns off the discharging current control switching element upon detection of the overdischarge.

(8) When the discharging current control switching element turns off, the abnormal charging current detection is ineffective, and the charging current control switching element turns on.

(9) When the charging current control switching element turns on, charging from the abnormal charger starts again, and the operation return to the operation (1).

If there is a circuit for holding the abnormal charging current detection state, since the abnormal charging current state is held in the operation (8), oscillation stops.

Also, even if the holding circuit 23 is not used, if an over discharge detection function stops after detection of the abnormal charging current (if the discharging current control switching element is prevented from turning off after detection of the abnormal charging current), it is possible to prevent oscillation when the abnormal charger is connected to the secondary battery having the overdischarge detection voltage or less.

Figure 3:
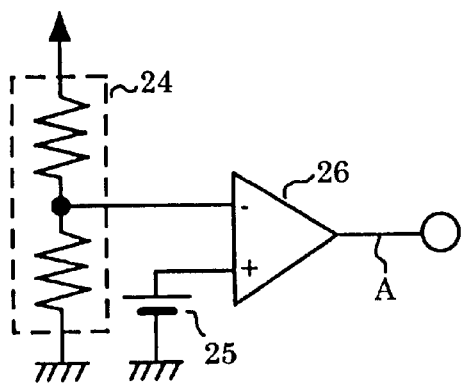
FIG. 3 is a diagram showing an overcharge detecting circuit in accordance with the present invention.

Specific examples of circuit blocks (7 to 11 and 23) in FIG. 1 showing the embodiment of the present invention are shown in FIGS. 3 to 9. FIG. 3 is an example of overcharge detecting circuit 7 in FIG. 1. The overcharge detecting circuit 7 has a function that compare between the secondary batter positive electrode connection terminal 2 and the secondary battery negative electrode connection terminal 3 to compare a voltage divided by resistive divider 24, which control overcharge detecting voltage with an output voltage of the reference voltage circuit 25 by comparator circuit 26 and if the output voltage of secondary battery 15 becomes higher than the overcharge detecting voltage the voltage of an output signal line A changes High to Low. Besides the circuit, another circuit can be used for change the output of the comparator 26 Low to High. Further, another circuit can be used for detecting an reset the overchange state with hysteresis voltage or delay the detecting and reset prevent from oscillating the output of the comparator circuit 26.

Figure 4:
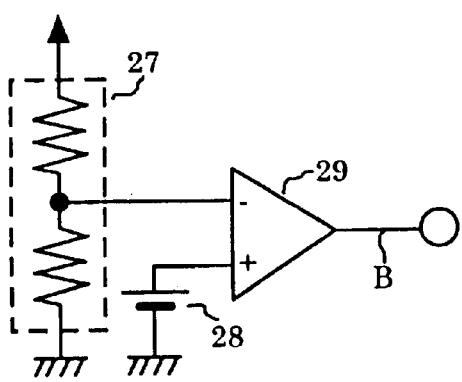
FIG. 4 is a diagram showing an overcharge detecting circuit in accordance with the present invention.

FIG. 4 is an example of overdischarge detecting circuit 8 in FIG. 1. The circuit compare between the secondary battery positive electrode 2 and the negative electrode 3 by compare the divided voltage with resistive divider 27 for divide the overdischarge detecting voltage control with output of the reference voltage circuit 28 by comparator. Then if the output of secondary battery 15 becomes lower than the output of the overdischarge detecting voltage, the voltage of output signal line B of the comparator 29 changes Low to High. Besides another circuit can be used for change the output of the comparator High to Low. Further histeresis voltage for detecting and reset the overdischarge or delaying the detection and reset can prevent from oscillating the output of the comparator circuit 29.

Figure 5:
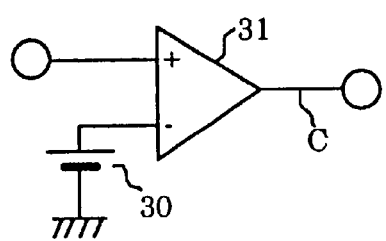
FIG. 5 is a diagram showing an overcurrent detecting circuit in accordance with the present invention.

FIG. 5 is an example of overcurrent detecting circuit 9 in FIG. 1. The circuit compare the voltage of charger negative electrode connection terminal 6 with output of reference voltage circuit 30 voltage the output signal line C of the comparator 31 becomes Low to High. Besides another circuit can be used for change the output of the comparator 31 from High to Low. Further to prevent from oscillating the comparator 31, histeresis voltage for overcurrent detecting and reset or delaying the detecting and reset can be used.

Figure 6:
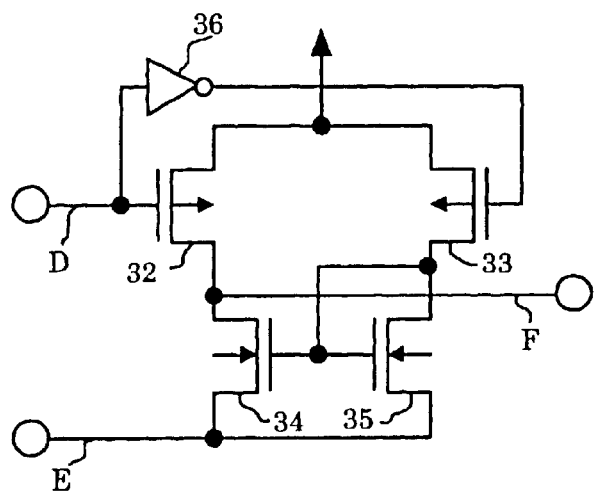
FIG. 6 is a diagram showing a level converting circuit in accordance with the present invention.

FIG. 6 is an example of level converting circuit 10 in FIG. 1. The circuit convert the Low voltage of input signal line D of the level converting circuit from the voltage of secondary battery negative electrode terminal 3, in FIG. 1 to the voltage of charger negative electrode connecting terminal 6, the voltage of input signal line E of a potential of charger negative electrode, and output to output signal line F of the level converting circuit. For example, if input line D of the level converting circuit is equal to the voltage of secondary battery positive electrode terminal 3, than turn off the P channel transistor 32, output of inverter circuit 36 becomes same voltage to the voltage of secondary battery negative electrode terminal 2, turn on the P channel transistor 33, turn on the N channel transistor 34 and output the output voltage of output signal line F of the level converting circuit 6 which is a voltage of input signal line E of the charger negative electrode potential.

Next, if the voltage of input signal line D of the level converting circuit is equal to the voltage of secondary battery negative electrode terminal 3, then P channel transistor 32 turns on, output of the inverter circuit 36 is equal to the secondary battery positive electrode 2, P channel transistor turns off, N channel transistor turns off and output voltage of output signal line F of the level converting circuit outputs the output of secondary battery positive electrode terminal 2.

Figure 7:
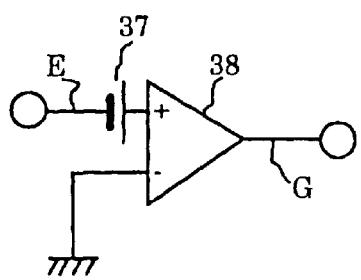
FIG. 7 is a diagram showing an abnormal charging current detecting circuit in accordance with the present invention.

FIG. 7 is an example of the abnormal charging current detecting circuit 11 in FIG. 1. The circuit compares the added voltage of charger negative electrode connecting terminal 6 and a voltage of an offset voltage generator circuit with the voltage of the secondary battery negative electrode terminal 3 by the comparator circuit 38. Then if the voltage of the charger negative electrode connecting terminal 6 becomes lower than the voltage of the abnormal charge current detecting voltage, then output signal line C of the comparator circuit 38 changes High to Low. Besides another circuit can be used for changes the output of the comparator circuit 38 from Low to High. Moreover to prevent the comparator circuit 38 from oscillating a histeresis voltage for detecting and rest the abnormal charge current or delaying to detecting and reset the circuit. In FIG. 7, the offset voltage regulator circuit 37 is separate from the comparator 38, however a comparator circuit 38 having an offset voltage without the offset voltage generating circuit 37 can be used.

Figure 8:
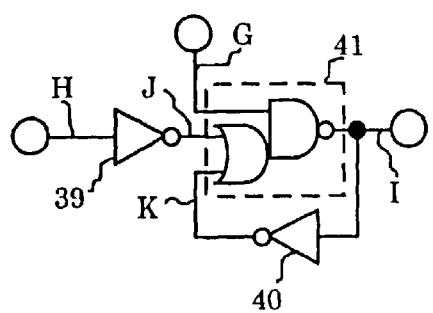
FIG. 8 is a diagram showing a holding circuit in accordance with the present invention.
Figure 9:
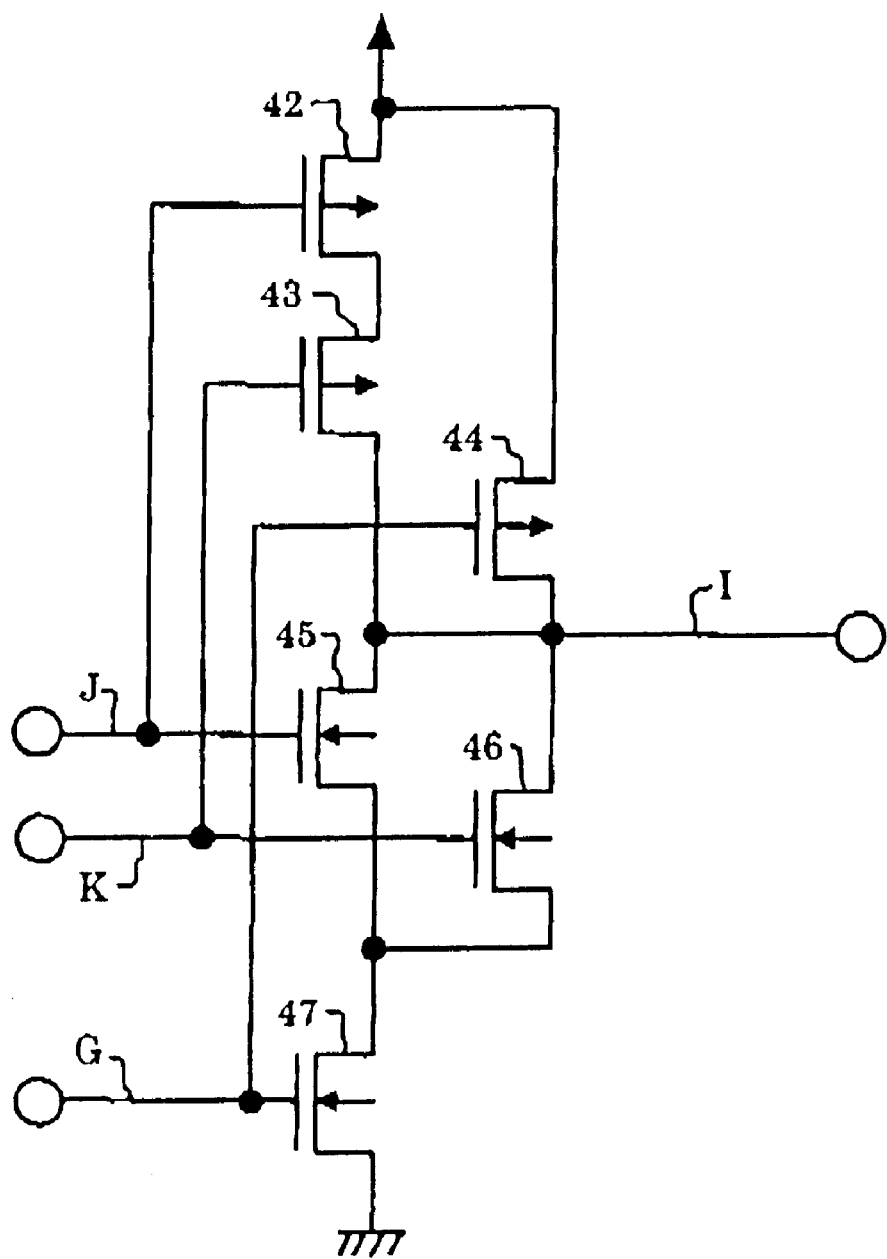
FIG. 9 is a diagram showing an OR-NAND circuit in accordance with the present invention.

FIG. 8, is an example of the hold circuit 23 in FIG. 23. The circuit of FIG. 8 is a kind of 5R latch circuit and has function s of the input signal line H of the hold circuit corresponds to a set bar input input and an output signal line G of abnormal charge current detecting circuit correspond to reset bar input. If the output of H is High and input signal H changes Low to High then output signal line I of the hold circuit holds Low. Next in case the output signal line G of the abnormal charge current detecting circuit becomes Low, which is in case the abnormal charge current is reset, then the output of the output signal line I returns to Low. The portion inner dot line of FIG. 8 is a OR-NAND circuit 41 and the circuit 41 is shown in FIG. 9 and comprises three P channel transistors 42, 43, 44 and three N channel transistors 45, 46, 47 and logically NAND circuit having a OR on one side.

Any circuits other than the circuits shown in FIGS. 3 to 9 can be applied to the present invention if they realize the intention of the present invention. The present invention is concerned with the protective IC and the protective device which are structured in accordance with the concept stated in the aspects and therefore is not limited by means for realizing the concept of the present invention.

As was described above, according to the present invention, since the abnormal charging current is detected by using the resistance value of the on-state of the switching element without using the current fuse, it is possible to detect the abnormal charging current many times, without a case in which the protective device is never again used after the abnormal charging current is detected. Also, since heat caused by the surplus resistance component such as the current fuse is not produced, the discharge efficiency is improved. Further, since the current fuse is unnecessary, the number of parts is reduced and the mounted area is also reduced, thereby making it possible to lower the costs and to decrease the size and the weight.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A charge/discharge controlling semiconductor device for controlling a charging current flowing from a charger to a secondary battery and a discharging current flowing from the secondary battery to a load by the on/off operation of at least one switching element, wherein an abnormal charging current is detected by using the resistance value of the on-state of said switching element.

2. The charge/discharge controlling semiconductor device as claimed in claim 1, wherein abnormal charging current can be detected only when the discharging current control switching element is on.

3. The charge/discharge controlling semiconductor device as claimed in claim 2, wherein said abnormal charging current is detected, and the abnormal charging current detection state is held until said charger is separated from said secondary battery.

4. The charge/discharge controlling semiconductor device as claimed in claim 2, wherein said abnormal charging current is detected, and an overdischarge detection function stops until said charger is separated from said secondary battery.

* * * * *